United States Patent
Popovich

Patent Number: 6,115,151
Date of Patent: Sep. 5, 2000

[54] METHOD FOR PRODUCING A MULTI-LAYER HOLOGRAPHIC DEVICE

[75] Inventor: Milan M. Popovich, Leicester, United Kingdom

[73] Assignee: DigiLens, Inc., Sunnyvale, Calif.

[21] Appl. No.: 09/469,712

[22] Filed: Dec. 21, 1999

Related U.S. Application Data

[60] Provisional application No. 60/114,176, Dec. 30, 1998.

[51] Int. Cl.[7] .............. G03H 1/08; G03H 1/18; G03H 1/26
[52] U.S. Cl. .................. 359/9; 359/4; 359/10; 359/22; 359/35; 349/201; 430/1
[58] Field of Search ................. 359/9, 10, 22, 359/24, 35, 3, 4, 5, 6, 7; 349/183, 201; 430/1, 2; 348/40, 41

[56] References Cited

U.S. PATENT DOCUMENTS

| | | | |
|---|---|---|---|
| 3,807,829 | 4/1974 | Close | 350/3.5 |
| 4,790,613 | 12/1988 | Moss | 350/3.7 |
| 4,932,731 | 6/1990 | Suzuki et al. | 350/3.7 |
| 4,981,332 | 1/1991 | Smith | 350/3.6 |
| 5,035,474 | 7/1991 | Moss et al. | 350/3.7 |
| 5,044,709 | 9/1991 | Smith et al. | 359/13 |
| 5,151,724 | 9/1992 | Kikinis | 357/17 |
| 5,278,532 | 1/1994 | Hegg et al. | 345/7 |
| 5,305,124 | 4/1994 | Chern et al. | 359/13 |
| 5,424,866 | 6/1995 | Kikinis | 359/292 |
| 5,440,428 | 8/1995 | Hegg et al. | 359/630 |
| 5,537,232 | 7/1996 | Biles | 359/15 |
| 5,550,701 | 8/1996 | Ichikawa | 359/15 |
| 5,569,565 | 10/1996 | Kawakami et al. | 359/3 |
| 5,581,378 | 12/1996 | Kulick et al. | 359/9 |
| 5,680,231 | 10/1997 | Grinberg et al. | 359/15 |
| 5,703,702 | 12/1997 | Crane et al. | 359/1 |

*Primary Examiner*—Jon Henry
*Attorney, Agent, or Firm*—Ritter, Van Pelt & Yi LLP

[57] ABSTRACT

A method of making a holographic device comprising sensitizing a plurality of layers and stacking the layers to form a composite structure. Each layer is sensitized to at least one color wavelength. The method further includes directing at least two laser beams at the composite structure. Each of the laser beams is oriented at an angle with respect to an incident surface of the composite structure such that the laser beams intersect one another within one of the layers of the composite structure. The laser beams are moved along the layer to create interference patterns in the sensitized layer.

27 Claims, 6 Drawing Sheets

METHOD FOR PRODUCING A MULTI-LAYER HOLOGRAPHIC DEVICE

RELATED APPLICATION

The present application claims the benefit of U.S. Provisional Application Ser. No. 60/114,176, filed Dec. 30, 1998.

BACKGROUND OF THE INVENTION

The present invention relates generally to holographic devices, and more particularly to a method for making multi-layer holograms.

As electronic technology advances there is an increase in demand to incorporate graphic displays into a variety of products. Color graphic displays are typically based on miniature liquid crystal displays on silicon substrates. The displays are typically monochromatic. Color imagery is generally provided by multiplexing of the additive primary colors red, green, and blue. In temporal multiplexing colors are sequentially switched between the three primary colors and if the switching rate is fast enough, the eye temporarily integrates the three images to form a single full color image. In order to modulate the intensity of each color, a color filter is typically combined in series with a display capable of generating a gray scale which is synchronized with the color filter. As new technology provides smaller display panels, there is a problem of magnifying the tiny images displayed on the display chips to give practical fields of view. Conventional optical solutions are generally large and cumbersome. Holographic optical elements, which are intrinsically thin and light weight, offer a solution for many applications such as wearable displays. Since holographic optical elements are intrinsically narrow band devices, color imaging applications require the use of separate red, green, and blue holographic optical elements stacked together. The stacking of holographic optical elements, however, presents a major optical alignment problem.

A color display may also be formed with a microdisplay and a holographic optical element comprising three separate holographic layers, each layer sensitized to one of the primary colors. Each layer is typically produced individually and the layers are stacked together to form the holographic optical element. Since the holograms are formed separately in each layer, the layers must be properly aligned when the layers are stacked together to form the holographic optical element. Improper alignment of the layers may result in poor image display.

There is, therefore, a need for a method for producing efficient multi-layer holograms which eliminate the need to align individually created holograms.

SUMMARY OF THE INVENTION

A method of producing multi-layer holographic devices is disclosed. The method includes sensitizing a plurality of layers, each layer being sensitized to at least one color wavelength, and stacking the layers to form a composite structure. The method further includes directing at least two laser beams at the composite structure. The laser beams are oriented at an angle with respect to an incident surface of the composite structure such that the laser beams intersect one another within one of the sensitized layers of the composite structure. The laser beams are moved over the sensitized layer to create interference patterns in the sensitized layer.

A non-sensitized substrate may be positioned between adjacent layers to space the layers from one another.

The laser beams may contain a single wavelength corresponding to a sensitized color of one of the layers to produce interference fringes in only one layer at a time. Alternatively, lasers may emit red, green, and blue light at one time to form interference fringes simultaneously in each layer.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
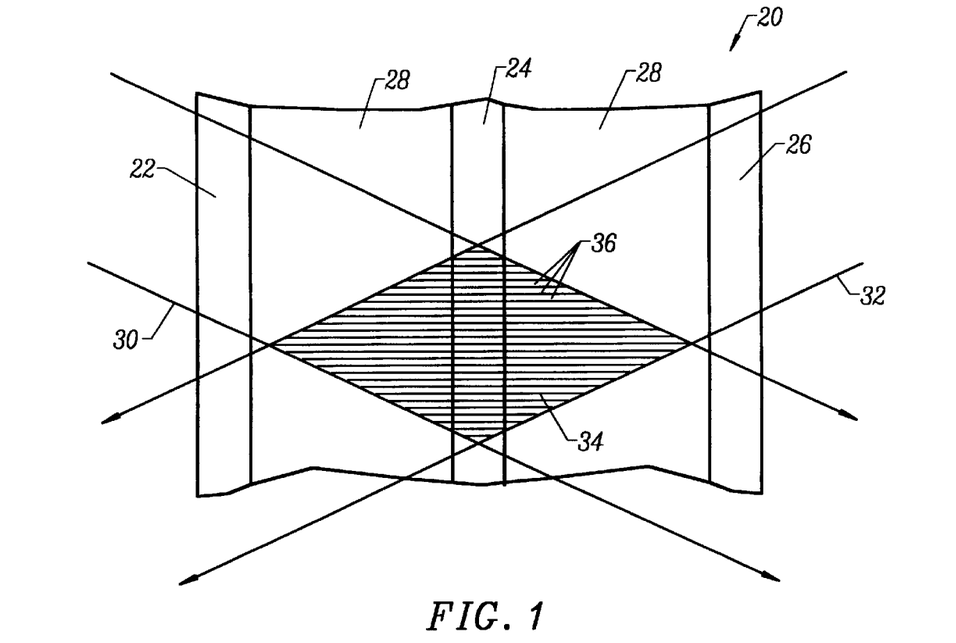
FIG. 1 is a partial front view of one embodiment of a multi-layer holographic device of the present invention.

Referring now to the drawings, and first to FIG. 1, a multi-layer holographic device, generally indicated at 20, is shown. Each layer of the holographic device 20 includes a hologram which is used to control transmitted light beams based on the principles of diffraction. The light that passes through the hologram is diffracted by interference fringes recorded in the hologram to form an image. Depending on the recording, the hologram is able to perform various optical functions such as color filtering. For example, the multi-layer holographic device may be used as a color sequential magnifier and filter which is positioned between a microdisplay and a light source to display color images. The holographic device 20 may be used in various types of display systems including head mounted display systems, for example.

The multi-layer holographic device 20 comprises three layers of holographic material 22, 24, 26, each layer having a hologram formed therein. The holograms may be either transmissive or reflective. Each layer of holographic material 22, 24, 26 is sensitized to red, green, or blue light. The layers 22, 24, 26 each include a high concentration of particular dyes to ensure that each layer is sensitive to only one of the red, green, and blue colors. The first layer 22 includes a dye which causes the layer to be sensitized to red light, the second layer 24 includes a dye that causes the layer to be sensitized to green light, and the third 26 layer includes a dye that causes the layer to be sensitized to blue light.

The three layers 22, 24, 26 are spaced from one another with a substrate 28 interposed therebetween. The substrate is preferably a non-sensitized substrate such as glass, or any other suitable non-sensitized material. Transparent electrodes may be deposited on opposing surfaces of the substrate which are used to encapsulate the holographic optical elements. The substrates may be composed of rigid flat or curved glass, plastic or composite materials, or flexible glass, plastic, or composite materials. As further described below, the electrodes may be composed of transparent conducting material such as ITO or conducting polymers, for example. The electrodes may be coated with anti-reflection coating. Switching circuitry may be deposited on any of the above substrates including the flexible substrates.

The layers 22, 24, 26 are preferably between 5 and 12 microns thick and the non-sensitized substrates 28 are preferably between 0.4 and 0.8 mm thick.

It is to be understood that the multi-layer holographic device may be different than shown and described herein. For example, the three holographic layers may be positioned in a different order than shown, the multi-layer device may comprise a different number of layers, and the layers and substrates used to space the layers may have different sizes.

The diffractive properties of the hologram depend primarily on recorded holographic interference fringes in the holographic material of the layers 22, 24, 26. The holographic fringes may be created by applying beams of light to the holographic material. As described below, the fringes may be created in the layers either sequentially using red, green, and blue laser beams in turn, or simultaneously using red, green, and blue laser beams together.

FIG. 1 illustrates the forming of a holographic interference fringe in the green-sensitized layer 24. Laser beams 30, 32 are directed at opposite sides of the holographic device 20 and positioned to intersect at an intersection region 34. The laser beams 30, 32 emit light consisting essentially of green wavelength bands. The laser beams 30, 32 are oriented at an angle with respect to an incident surface of the composite structure such that the laser beams intersect one another within layer 24. The intensities of the laser beams 30, 32 are preferably controlled such that their combined energies are slightly greater then the threshold needed to cause polymerization of the material in layer 24, while their individual energies are just below this threshold. The layer exposure duration may also be used to control polymerization of the material. The interfering wavefronts of beams 30, 32 create holographic interference fringes 36 in the layer 24 by polymerization of the green sensitized material. The fringes are controlled to produce the hologram by moving the laser beams 30, 32 and their intersection region 34. Even though layer 24 is sensitized to a green wavelength bandwidth, there may be some sensitivity of the layer to red and blue. For this reason, the laser beams 30, 32 are arranged to intersect at a volume which, although extending into the adjacent substrate 28, does not extend into the adjacent red and blue sensitized layers 22, 26.

Red and blue laser beams are similarly used to produce interference fringes in the layers 22, 26, respectively. The forming of the fringes in the layers 22, 24, 26 can be done either in turn by sequentially subjecting the respective layers to red, green, and blue laser light, or simultaneously by subjecting the respective layers to red, green, and blue laser light at one time.

Figure 2:
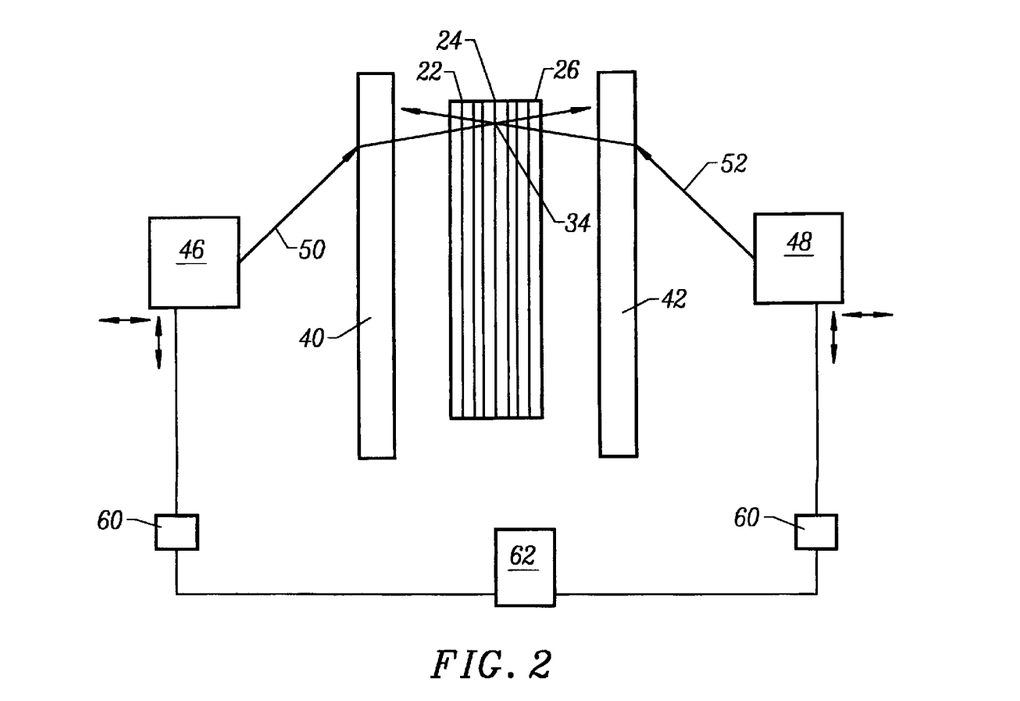
FIG. 2 is a schematic illustrating a method of producing the multi-layer holographic device of FIG. 1.

FIG. 2 shows one arrangement for producing the multi-layer holographic device 20 shown in FIG. 1. After the layers 22, 24, 26, 28 are stacked together to form the composite structure, it is positioned between beam shaping optics 40, 42 which are used to control profiles of the interfering wavefronts of laser beams 50, 52 at an intersection region (e.g., region 34 of FIG. 1) to create fringes with the appropriate geometry. The shaping optics 40, 42 may include conventional optical elements such as refractive or reflective optical elements, diffraction elements, holographic elements, switchable holographic optical elements, or any combination of these elements, as is well known by those skilled in the art. Lasers 46, 48 are positioned on opposite sides of the composite structure adjacent to the shaping optics 40, 42, respectively. The lasers 46, 48 are positioned so that reference laser beams 50, 52 intersect at intersection region 34 (FIGS. 1 and 2). The lasers 46, 48 are each controlled by a scanning device 60 which is operable to move the laser beams 50, 52 so that the intersection region 34 is scanned or stepped across the layer 22, 24, 26. The scanning devices 60 are preferably controlled by a common controller 62 so that the laser beams 50, 52 are moved simultaneously and over the same distance relative to the composite structure. The scanning device 60 may be a laser writing device used to create gratings for holographic devices, as are well known by those skilled in the art. The reference beams 50, 52 may also be formed from a single laser beam which is split into two beams by a beam splitter (not shown) and directed to opposite sides of the intersection region 34 with a system of movable mirrors.

Figure 3:
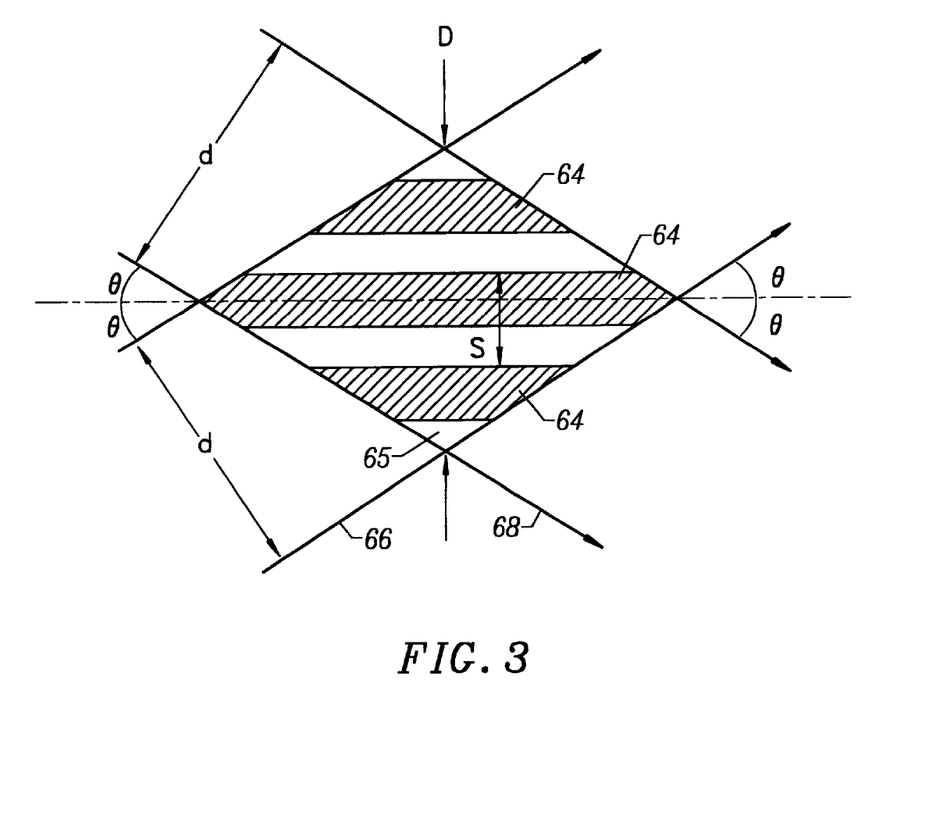
FIG. 3 is a schematic illustrating dimensions used to calculate the number of interference fringes produced by laser beams and the spacing between the fringes.

FIG. 3 illustrates dimensions used to calculate the number of interference fringes created within an intersection volume by a pair of laser beams and the spacing between the fringes. Fringes 64 are shown within intersection region 65 located between laser beams 66, 68. The laser beams 66, 68 each have a cross section dimension d and intersect at an angle $2\theta$ (see FIG. 3). The spacing between fringes 5 may be calculated as:

$$S=\lambda/[2 \sin \theta].$$

The width D of the intersection region is calculated as:

$$D=d/[\cos \theta].$$

The number of fringes N within intersection region 65 may then be calculated as:

$$N=D/S=(2d/\lambda)[\tan \theta].$$

Figure 4A:
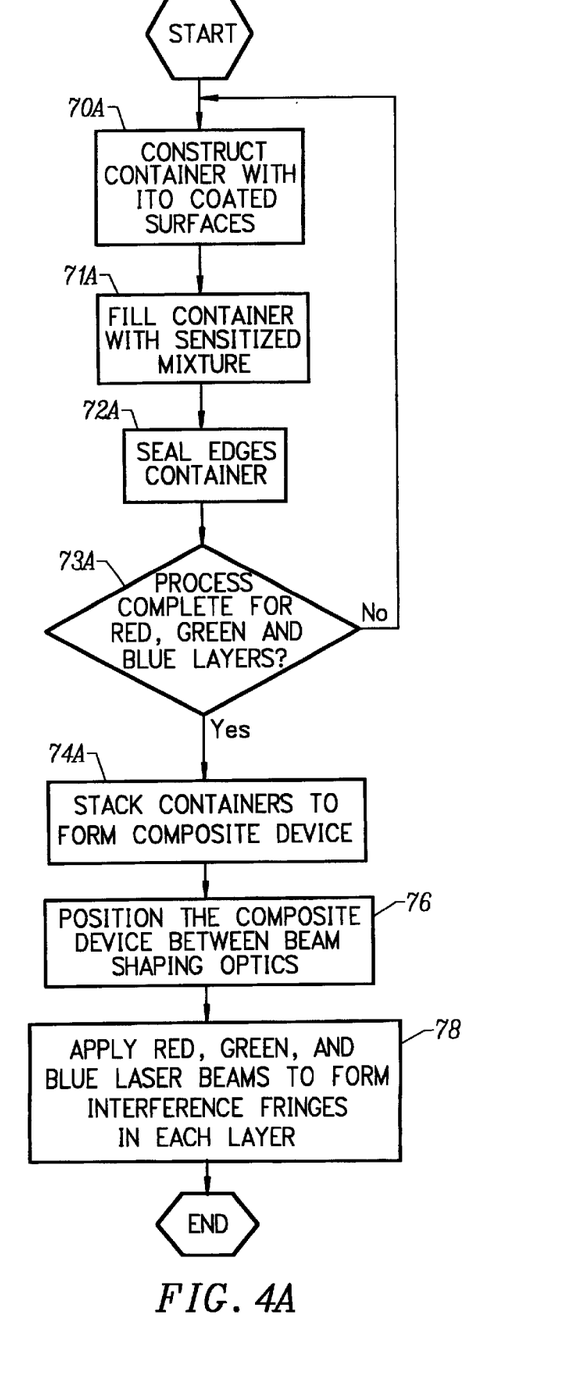
FIG. 4A is a flowchart illustrating a process for making the multi-layer holographic device of FIG. 1.

FIG. 4A is a flowchart illustrating a process for making the multi-layer holographic device 20 of FIG. 1. Each of the sensitized hologram layers are formed separately. A parallel sided thin container (bottle) comprising a pair of thin electrodes (e.g., ITO) coated glass or plastic walls separated by a narrow gap is constructed (step 70A). The bottle is filled with the mixture sensitized to red light (step 71A). The edges are then sealed with a suitable adhesive (step 72A). The process is then repeated for the green and blue sensitized holograms (step 73A). The separate containers are then stacked to form a composite device (step 74A).

Figure 4B:
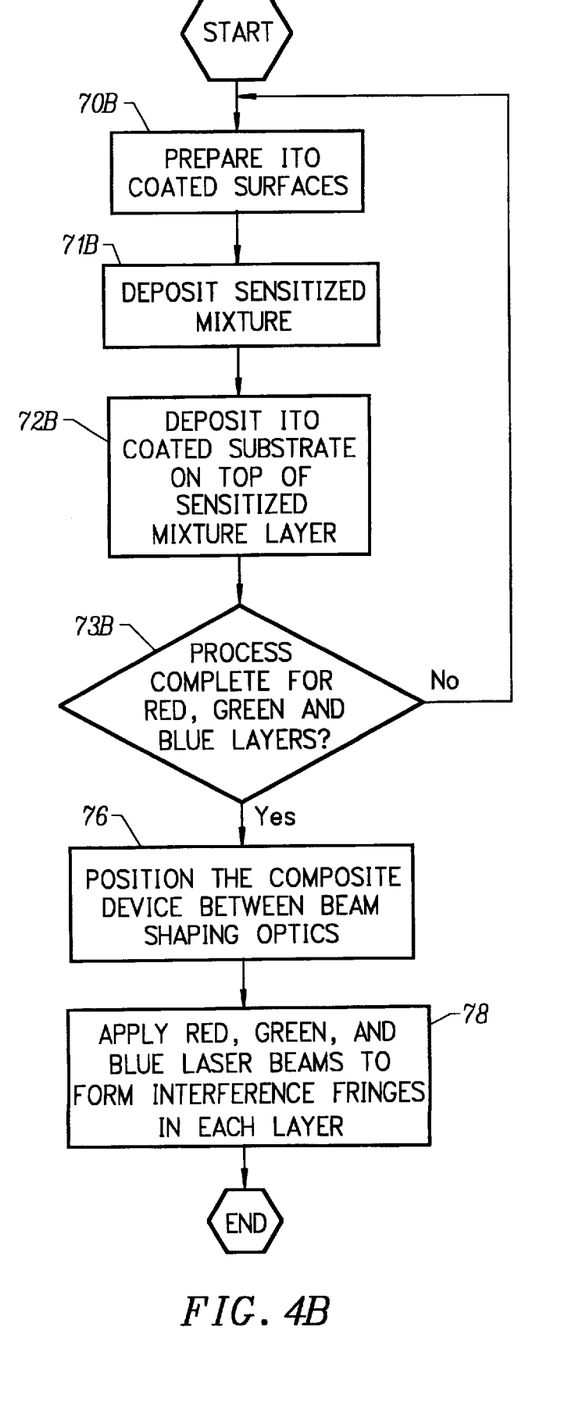
FIG. 4B is a flowchart illustrating an alternate process for making multi-layer holographic device of FIG. 1.

An alternate process for making the composite structure is illustrated in the flow chart of FIG. 4B. The stack is built by starting with the substrate to which an electrode coating has already been applied (step 70B). A layer of holographic syrup is then deposited onto the structure (step 71B). The substrate layer coated with an electrode layer is added and positioned such that electrode layers on the substrate bounding the hologram are facing one another (step 72B). The process is then repeated to construct the second and third hologram layers (step 73B). The substrate separating the first and second and second and third hologram layers may comprise two separated ITO coated substrates or alternatively a single substrate with ITO applied to both sides.

The composite structure produced from one of the above-described methods, or other suitable methods is placed into a retaining fixture (not shown) which is positioned between shaping optics 40, 42 (step 76) (FIGS. 2, 4A, and 4B). Lasers 46, 48 are fixably attached to scanning devices 60 which are movable relative to the composite structure to direct laser beams 50, 52 at a region within one of the layers 22, 24, 26. As shown in FIG. 1, green laser beams 30, 32 are positioned to intersect at the green sensitized layer 24 and create holographic interference fringes 36 by polymerization of the sensitized material. The lasers 46, 48 are moved by the scanning devices 60 to produce the hologram (FIG. 2). Red laser beams are used to create interference fringes in the red sensitized layer 22 and blue laser beams are used to create interference fringes in the blue sensitized layer 26 (step 78). Alternatively, the lasers 46, 48 may produce a laser beam which emits red, green, and blue laser light simultaneously. The different wavelengths of each color results in interference regions formed in each of the layers 22, 24, 26.

Figure 5:
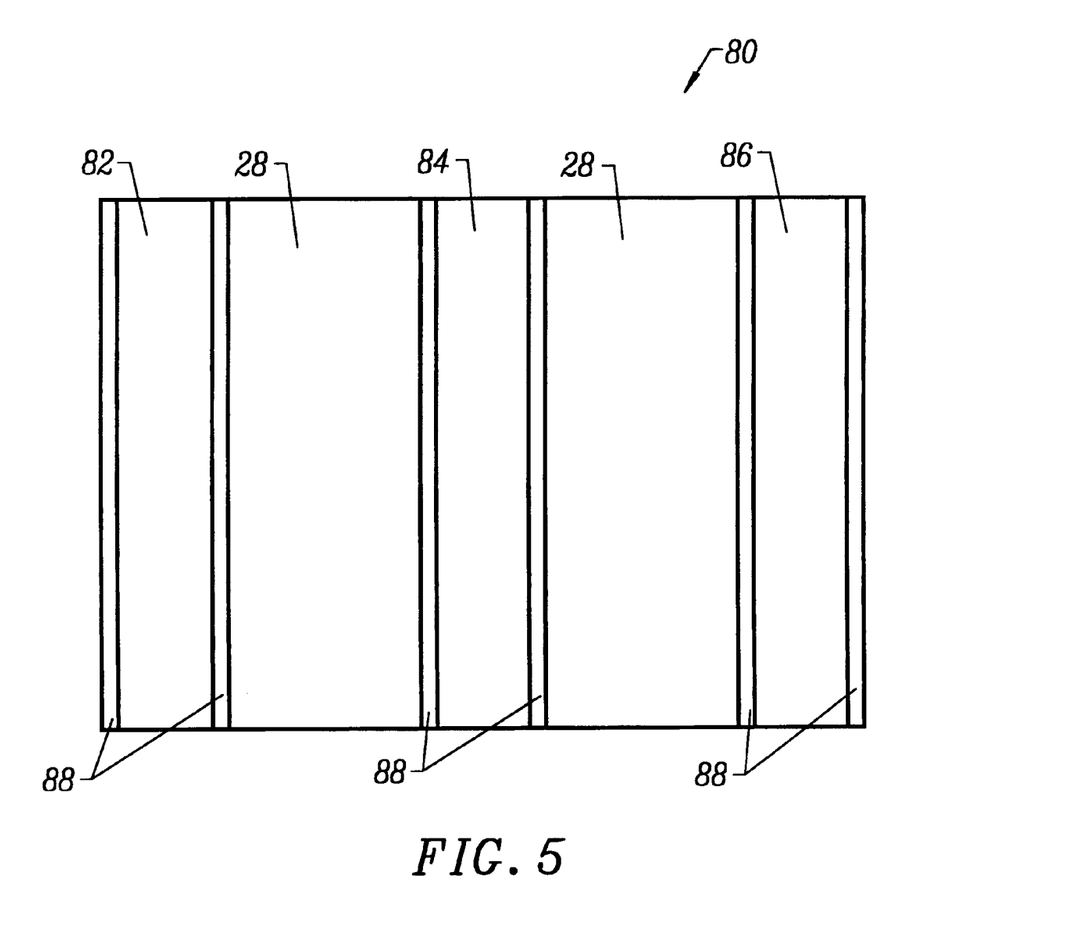
FIG. 5 is a schematic illustrating a switchable multi-layer holographic device.
Figure 6:
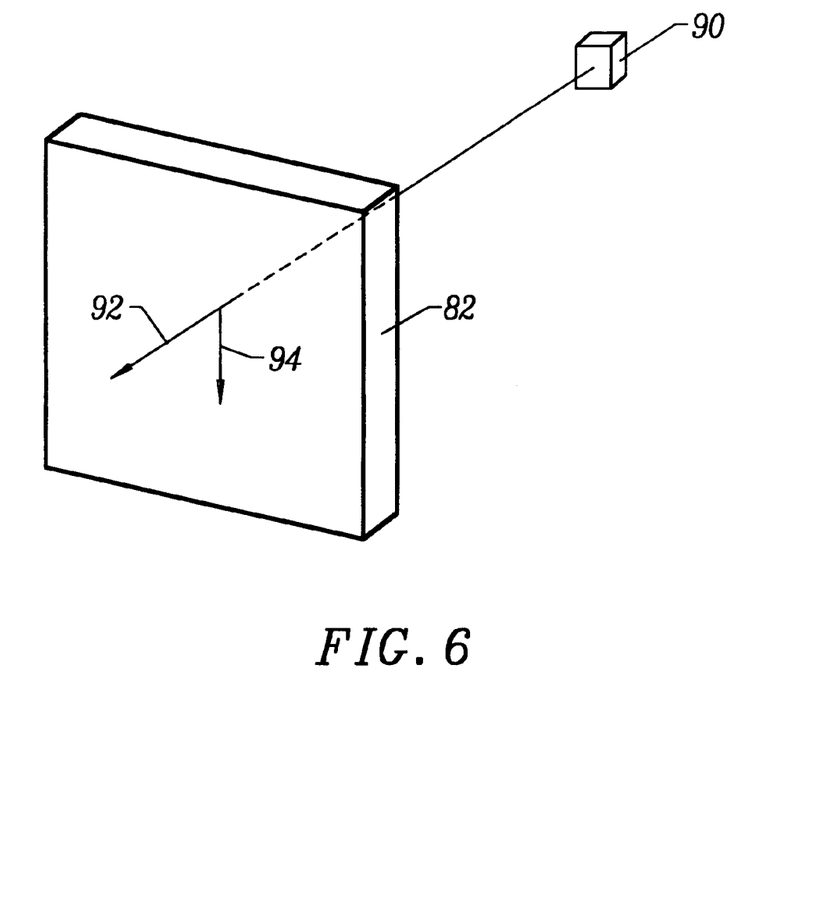
FIG. 6 is a perspective view of a holographic optical element of the switchable multi-layer holographic device of FIG. 5 and a light source.
Figure 7:
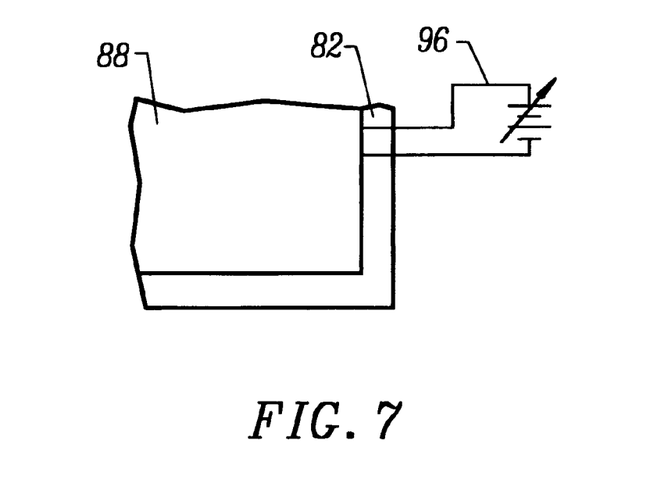
FIG. 7 is a partial front view of the holographic optical element of FIG. 6.

The layers of the multi-layer holographic device may also be configured to be switchable between an active state and a passive state by incorporating suitable electrodes as shown in FIG. 5. The switchable holographic device, generally indicated at 80, includes three switchable holographic optical elements 82, 84, 86. Each holographic optical element 82, 84, 86 includes a layer of holographic material sensitized to red, green, or blue light interposed between two electrode layers 88. The red layer 82 is optimized to diffract red light, the green layer 84 is optimized to diffract green light, and the blue layer 86 is optimized to diffract blue light. The holographic material of each layer 82, 84, 86 may comprise a photopolymer/liquid crystal composite material such as a holographic photopoloymeric film which has been combined with liquid crystal, for example. The presence of the liquid crystal allows the hologram to exhibit optical characteristics which are dependent on an applied electrical field. The hologram selectively directs an incoming light beam from a light source 90 either towards or away from a viewer and selectively diffracts light at certain wavelengths into different modes in response to a voltage applied to the electrodes 88 (FIGS. 6 and 7). Light passing through the hologram in the same direction that the light is received from the light source 90 is referred to as the zeroth (0th) order mode 92. When no voltage is applied to the electrodes 88, liquid crystal droplets within the holographic optical element 82 are oriented such that the hologram is present in the element and light is diffracted from the zeroth order mode to a first (1st) order mode 94 of the hologram. When a voltage is applied to the holographic optical element 82, the liquid crystal droplets become realigned effectively erasing the hologram, and the incoming light passes through the holographic optical element in the zeroth order mode 92.

The electrodes (electrode layers) 88 are positioned on opposite sides of the holographic layer and are preferably transparent so that they do not interfere with light passing through the hologram. The electrodes 88 may be formed from a vapor deposition of Indium Tin Oxide (ITO) which typically has a transmission efficiency of greater than 80%, or any other suitable substantially transparent conducting material. Anti-reflection coatings may be applied to the ITO such that 99% of the light incident on a single electrode will be transmitted. The electrodes 88 are connected to an electric circuit 96 operable to apply a voltage to the electrodes, to generate an electric field (FIG. 7).

Initially, with no voltage applied to the electrodes 88, the hologram is in the diffractive (active) state and the holographic optical element 82 diffracts propagating light in a predefined manner. When an electrical field is generated in the hologram by applying a voltage to the electrodes 88 of the holographic optical element 82, the operating state of the hologram switches from the diffractive state to a passive (inactive) state and the holographic optical element does not optically alter the propagating light. It is to be understood that the electrodes 88 may be different than described herein. For example, a plurality of smaller electrodes may be used rather than two large electrodes which substantially cover surfaces of the holograms.

Preferably, only one pair of the electrodes 88 associated with one of the three layers 80, 82, 84 is energized at one time. In order to display a color image, a voltage controller (not shown) operates to sequentially display three monochromatic images of the color input image. The electrodes 88 attached to each of the holograms 82, 84, 86 are sequentially enabled such that a selected amount of red, green, and blue light is directed towards the viewer. For example, when a red monochromatic image is projected, the voltage controller switches the green and blue holograms 84, 86 to the passive state by applying voltages to their respective electrodes 88. The supplied voltages to the electrodes 88 of the green and blue holograms 84, 86 create a potential difference between the electrodes, thereby generating an electrical field within the green and blue holograms. The presence of the generated electrical field switches the optical characteristic of the holograms 84, 86 to the passive state. With the green and blue holograms 84, 86 in the passive state and the red hologram 82 in the diffractive state, only the red hologram optically diffracts the projected red image. Thus, only the portion of the visible light spectrum corresponding to the red light is diffracted to the viewer. The green hologram 84 is next changed to the diffractive state by deenergizing the corresponding electrodes 88 and the electrodes of the red hologram 82 are energized to change the red hologram to the passive state so that only green light is diffracted. The blue hologram 86 is then changed to the diffractive state by deenergizing its electrodes 88 and the electrodes of the green hologram 84 are energized to change the green hologram to the passive state so that only blue light is diffracted.

The holograms are sequentially enabled with a refresh rate which is faster than the response time of a human eye so that a color image will be created in the viewer's eye due to the integration of the red, green, and blue monochrome images created from each of the red, green, and blue holograms. Consequently, the holographic devices will be illuminated sequentially by red, green, and blue lights so that the final viewable image will appear to be displayed as a composite color. The red, green, and blue holographic elements 82, 84, 86 may be cycled on and off in any order.

The multi-layer hologram may also be formed with non-planar layers. For example, the layers may each have aligned curved surfaces to project a pre-distorted image which can be used to correct distortion typically present in an image projected from a flat image display (see e.g., U.S. patent application entitled Holographic Display System, by M. Popovich, Ser. No. 09/416,076, filed Oct. 12, 1999).

It will be observed from the foregoing that the multi-layer holographic device and method of making disclosed herein have many advantages. For example, the multi-layer device enables holograms to be created in layers which are already stacked in a composite holographic structure. The method described above for forming the multilayer device avoids the problems of alignment associated with holograms created in individual layers and later stacked together. Furthermore, the method allows for simplification of the recording optics, since the wavefront shape of the laser beams needs only to match the local geometry of the hologram. The method also allows for matching of the polarization of the recording laser beams to the required polarization characteristics of the hologram. Although the invention has been described with reference to imaging applications it is relevant to any application where two or more holographic optical elements need to be used in the form of a stack.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method of making a holographic device comprising:
   sensitizing a plurality of layers, each layer being sensitized to at least one color wavelength;
   stacking the layers to form a composite structure;
   directing at least two laser beams at the composite structure, each of the laser beams being oriented at an angle with respect to an incident surface of the composite structure such that the laser beams intersect one another within one of the layers of the composite structure; and
   moving the laser beams over the layer to create an interference pattern in the sensitized layer.

2. The method of claim 1 wherein stacking the layers comprises stacking the layers with non-sensitized substrates interposed between adjacent layers.

3. The method of claim 2 wherein the non-sensitized substrates are glass.

4. The method of claim 2 wherein stacking the layers further comprises fixably attaching the sensitized layers and the non-sensitized layers to form the composite structure.

5. The method of claim 1 wherein sensitizing a plurality of layers comprising sensitizing a first layer of holographic recording material to red light, sensitizing a second layer of holographic recording material to green light, and sensitizing a third layer of holographic recording material to blue light.

6. The method of claim 1 wherein directing at least two laser beams at the composite structure comprises splitting a laser beam to form a pair of laser beams.

7. The method of claim 1 wherein directing at least two laser beams at the composite structure comprises directing a pair of reference beams at opposites sides of the composite structure.

8. The method of claim 1 wherein directing at least two laser beams comprises directing a pair of laser beams having a single color wavelength.

9. The method of claim 8 wherein directing a pair of laser beams having a single color wavelength comprises directing a first pair of laser beams having a first color wavelength at a first color sensitized layer, directing a second pair of laser beams having a second color wavelength at a second color sensitized layer, and directing a third pair of laser beams having a third color wavelength at a third color sensitized layer.

10. The method of claim 1 wherein directing at least two laser beams comprises directing laser beams having a plurality of wavelengths.

11. The method of claim 1 wherein the interference pattern comprises holographic interference fringes.

12. The method of claim 1 further comprising attaching electrode layers to opposite sides of each of the sensitized layers.

13. The method of claim 1 wherein moving the laser beams comprises moving scanning devices, each of the laser beams being emitted from a laser attached to one of the scanning devices.

14. The method of claim 13 wherein moving the scanning devices comprising stepping the scanning devices along the composite structure.

15. The method of claim 13 wherein moving the scanning devices comprises simultaneously moving the scanning devices with an electronic controller.

16. The method of claim 1 wherein stacking said layers comprises spacing said layers approximately 0.4 to 0.8 mm apart.

17. The method of claim 1 wherein stacking the layers comprises building the layers on one another to form the composite structure.

18. The method of claim 2 further comprising coating the non-sensitized substrates with an electrode layer.

19. A method of creating holograms in a structure comprising a plurality of layers of holographic material, each layer being sensitized to at least one color wavelength, the method comprising:
   directing at least two laser beams at the structure, each of the laser beams being oriented at an angle with respect to an incident surface of the structure such that the laser beams intersect one another within one of the sensitized layers of holographic material; and
   moving the laser beams to create an interference pattern within the sensitized layer of holographic material.

20. The method of claim 19 wherein the structure further comprises layers of non-sensitized substrate interposed between the sensitized layers.

21. The method of claim 19 wherein directing at least two laser beams at the composite structure comprises splitting a laser beam to form a pair of laser beams.

22. The method of claim 19 wherein directing at least two laser beams at the composite structure comprises directing a pair of reference beams at opposites sides of the composite structure.

23. The method of claim 19 wherein directing at least two laser beams comprises directing laser beams having a single color wavelength.

24. The method of claim 23 wherein directing a pair of laser beams having a single color wavelength comprises directing a first pair of laser beams having a first color wavelength at a first color sensitized layer, directing a second pair of laser beams having a second color wavelength at a second color sensitized layer, and directing a third pair of laser beams having a third color wavelength at a third color sensitized layer.

25. The method of claim 19 wherein directing at least two laser beams comprises directing a pair of laser beams having a plurality of wavelengths.

26. The method of claim 19 wherein the interference pattern comprises holographic interference fringes.

27. The method of claim 19 wherein moving the laser beams comprises moving scanning devices, each of the laser beams being emitted from a laser attached to one of the scanning devices.

* * * * *